United States Patent [19]

Mori

[11] Patent Number: 4,920,460
[45] Date of Patent: Apr. 24, 1990

[54] SELF-ILLUMINATED GRILL FOR MOTOR VEHICLES

[75] Inventor: Hideshi Mori, Kitawaki, Japan

[73] Assignee: Koito Seisakusho Co., Ltd., Tokyo, Japan

[21] Appl. No.: 337,225

[22] Filed: Apr. 12, 1989

[30] Foreign Application Priority Data

Apr. 12, 1988 [JP] Japan .................. 63-90091

[51] Int. Cl.$^5$ .............................. B60Q 1/02
[52] U.S. Cl. ........................ 362/61; 362/80; 362/82
[58] Field of Search ............ 362/61, 80, 294, 82, 362/83, 83.3

[56] References Cited

U.S. PATENT DOCUMENTS

| 2,808,502 | 10/1957 | Large | 240/8.2 |
| 2,921,180 | 1/1960 | Stiglin | 240/7.1 |
| 3,020,391 | 2/1962 | Stiglin | 362/80 |
| 4,569,007 | 2/1986 | Dick | 362/294 |
| 4,816,968 | 3/1989 | Yamada et al. | 362/80 |

FOREIGN PATENT DOCUMENTS

| 3238104 | 3/1984 | Fed. Rep. of Germany | 362/61 |
| 3600928 | 1/1987 | Fed. Rep. of Germany | 362/61 |
| 1102215 | 10/1955 | France | 362/80 |
| 2482023 | 11/1981 | France | 362/61 |
| 530992 | 4/1955 | Italy | 362/80 |
| 2087187 | 2/1980 | United Kingdom | 362/80 |

*Primary Examiner*—Ira S. Lazarus
*Assistant Examiner*—Sue Hagarman
*Attorney, Agent, or Firm*—Browdy and Neimark

[57] ABSTRACT

A self-illuminated ornamental grill to be mounted between the pair of headlamps of a passenger car, comprising an elongate grill body and an elongate lens which are joined to each other to define a watertight lighting chamber. A pair of fog lamp assemblies or equivalent light sources are mounted in the lighting chamber so as to illuminate the complete length of the lens.

11 Claims, 9 Drawing Sheets

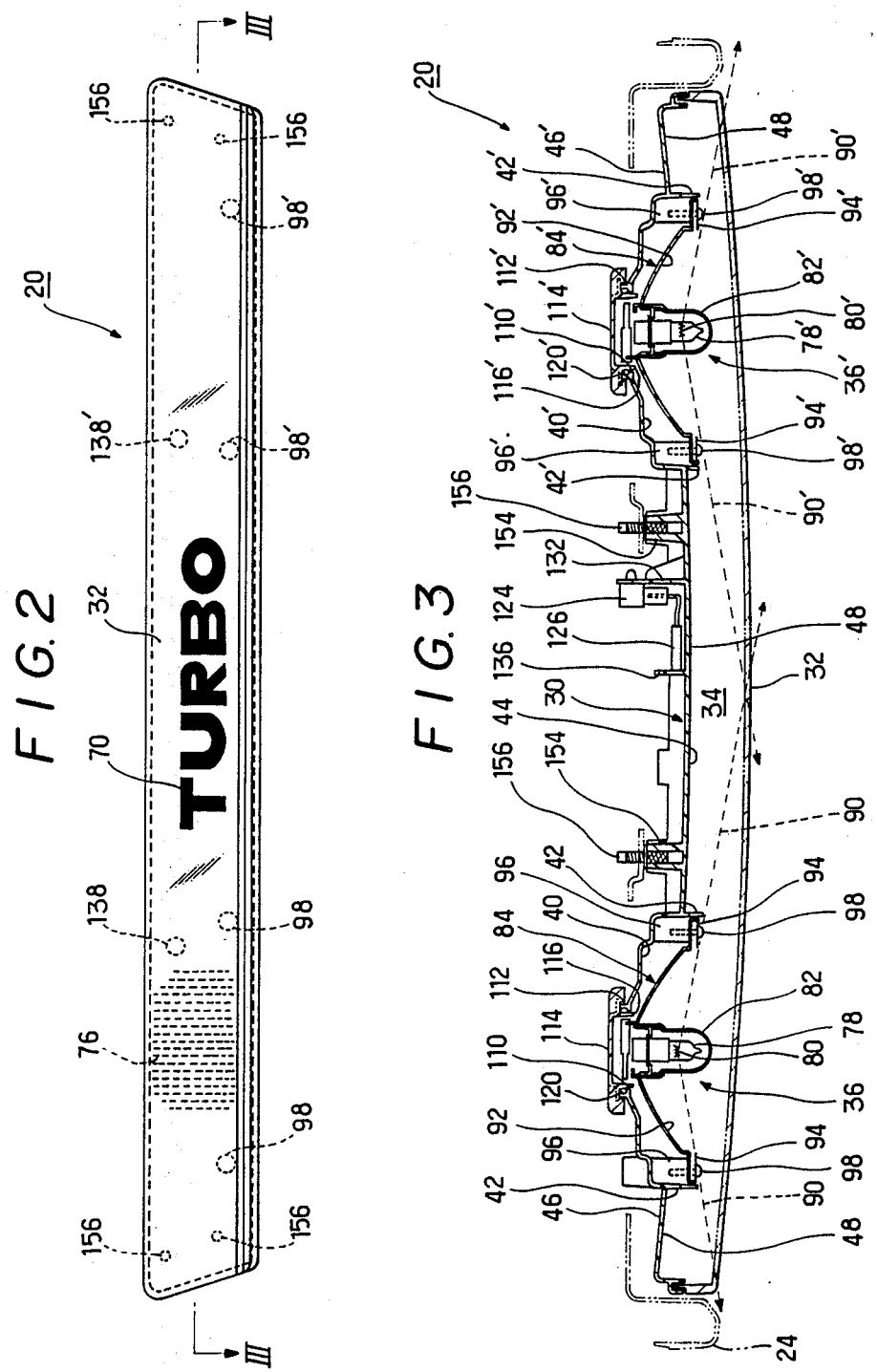

SELF-ILLUMINATED GRILL FOR MOTOR VEHICLES

BACKGROUND OF THE INVENTION

This invention relates to grills of motor vehicles, and more specifically to a self-illuminated grill of ornamental nature suitable for installation between the pair of headlamps of passenger cars among other vehicles.

Although the automotive grill was initially designed as an openwork metal screen hiding the core of the engine radiator, it is being used purely for ornamental or decorative purposes on some of today's passenger car models. As far as the applicant is aware, such ornamental grills have not been self-illuminated; that is, no light source means have been built into them for providing illumination of the grill itself or of the road ahead of the vehicle.

Passenger cars have not only a sealed beam headlamp system but also such auxiliary lighting devices as fog lamps at the front of the car body. Such auxiliary front lamps can be built into an ornamental grill to enhance an aesthetic appeal of the car without loss or diminuation of the intended functions of the lamps.

SUMMARY OF THE INVENTION

The present invention aims at the provision of a novel self-illuminated grill which may be mounted to passenger cars or other vehicles with advantages from both aesthetic and utilitarian points of view.

Briefly, the self-illuminated grill of the invention may be summarized as comprising an elongated grill body to be mounted to a vehicle body so as to be disposed horizontally between a pair of headlamps. An elongate lens is mounted to the grill body to define an enclosed lighting chamber in combination therewith. Light source emans are mounted in the lighting chamber so as to illuminate substantially the complete length of the lens.

Typically, the light source means taken the form of a pair of fog lamp assemblies. These lamp assemblies may be mounted in horizontally spaced apart positions in the lighting chamber so that the light emitted thereby will irradiate the complete area of the lens. Preferably, the those inside surface portions of the grill body which are left exposed by the lamp assemblies may be rendered reflective.

The grill with the built-in pair of fog lamp assemblies requires a smaller number of parts, and smaller numbers of assembling a smaller number of parts, and smaller numbers of assembling and mounting steps, than if the grill and the fog lamp assemblies were mounted in separate positions at the front end of the vehicle body as in the prior art.

When the lamp assemblies are lit up during night driving, the complete lens surface will be illuminated to give the appearance of a unitary lighting instrument. During daytime, too, the lens will be thoroughly irradiated by the daylight that has been reflected both by the reflectors of the lamp assemblies and by the reflective inside surface portions of the grill body. Thus the grill will lend a novel aesthetic appeal to the car design.

As an additional advantage, the lamp assemblies built into the grill may be used as supplemental headlights. For example, in the event of a failure of the primary headlamp system, the grill lamps may be lit up to enable driving without serious inconvenience.

The above and other features and advantages of this invention and the manner of realizing them will become more apparent, and the invention itself will best be understood, from a study of the following description and appended claims, with reference had to the attached drawings showing a preferable embodiment of the invention.

BRIEF DESCRIPTION OF THE DRAWINGS

FIG. 2 is an enlarged front elevation of the grill of FIG. 1;

FIG. 3 is a horizontal section through the grill, taken along the line III—III in FIG. 2;

DESCRIPTION OF THE PREFERRED EMBODIMENT

General

Figure 1:
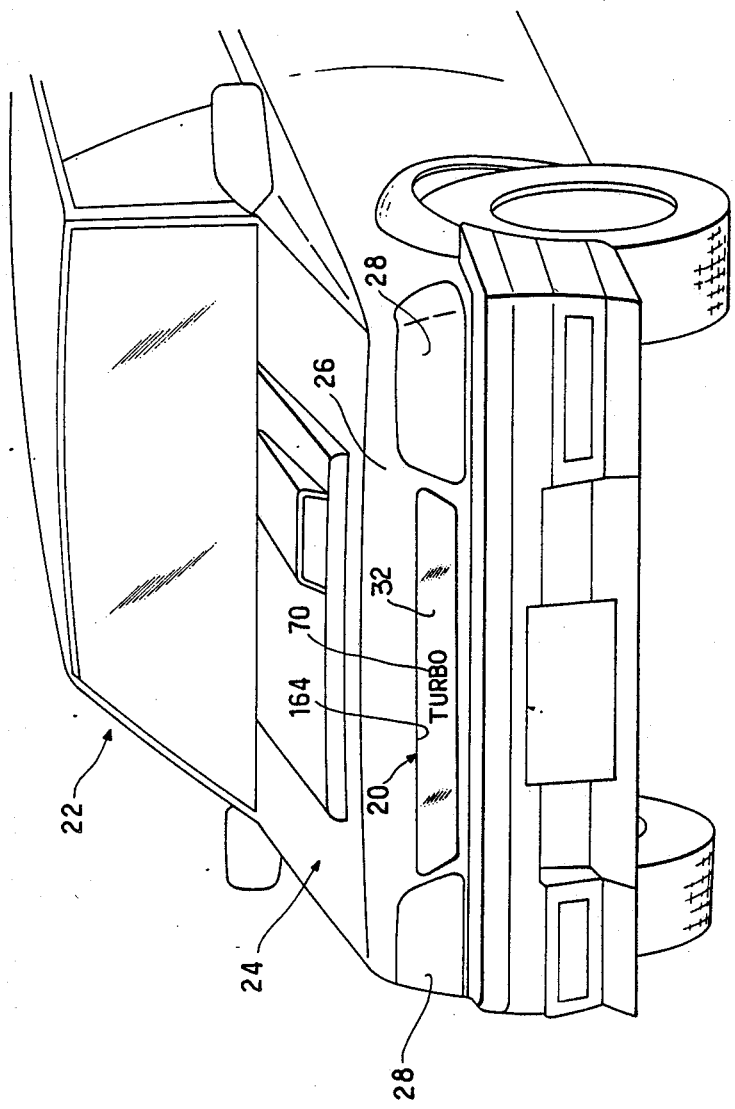
FIG. 1 is a partial perspective view of a passenger car furnished with the self-illuminated grill of the invention.

The self-illuminated grill of the invention is generally designated 20 in FIG. 1 and therein shown mounted to a four wheeled passenger car 22 as a typical example of motor vehicle to which the invention may be applied. The passenger car 22 has a car body 24 including a front end panel 26 with a pair of spaced apart headlamps 28 mounted thereto. The self-illuminated grill 20 is mounted to the front end panel 26 of the car body 24 so as to extend horizontally between the pair of headlamps 28.

FIGS. 2–5 are enlarged illustrations of the self-illuminated grill 20. It includes a horizontally elongated, generally concave, forwardly open grill body 30 seen in FIGS. 3–5. Closing the open front side of the grill body 30 is a lens 32 of matching shape and size. The grill body 30 and the lens 32 conjointly define an enclosed lighting chamber 34 revealed in FIG. 3.

Housed in the lighting chamber 34 are light source means which comprise a pair of fog lamp assemblies 36 and 36' in this particular embodiment. The two fog lamp assemblies 36 and 36' are disposed adjacent the opposite ends of the grill 20. Each fog lamp assembly is provided with a tilting mechanism 38 or 38' seen in part in FIGS. 4 and 5. The tilting mechanisms 38 and 38' enable the fog lamp assemblies 36 and 36' to be adjustably tilted back and forth about a horizontal axis extending longitudinally of the grill 20, in order to provide optimum illumination of the lens 32 and of the road ahead of the vehicle 22.

The following is a more detailed discussion of the noted grill body 30, lens 32, fog lamp assemblies 36 and 36', and lamp tilting mechanisms 38 and 38', followed by a description of how the grill 20 is mounted to the vehicle body 24, and of the functions and advantages gained by the grill. Such discussion will be divided under headings for the clarity of disclosure.

Grill Body

Figure 5:
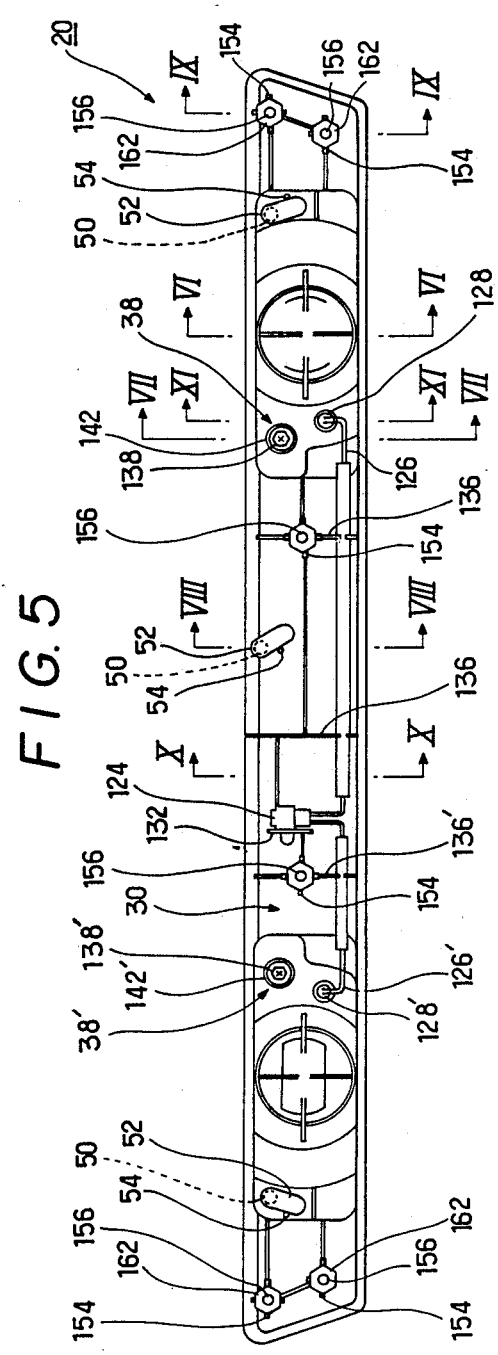
FIG. 5 is a rear elevation of the grill.

Molded of a rigid plastic, the grill body 30 is generally in the shape of an elongate strip as seen in a rear view as in FIG. 5. As will be seen from FIGS. 6–11, which show the cross sections of the grill 20 taken along the planes indicated in FIG. 5, the exact cross sectional shape of the grill body 30 differs from point to point in its longitudinal direction.

FIG. 3 best illustrates that the grill body 30 has a pair of rearward recesses 40 and 40' formed adjacent its opposite longitudinal ends. Each somewhat elongated horizontally, the recesses 40 and 40' accommodate the fog lamp assemblies 36 and 36', respectively. A pair of vertical ribs or screens 42 and 42' are formed on both sides of each of the recesses 40 and 40' so as to extend forwardly from the grill body 30. The ribs 42 and 42' function to determine the lateral or horizontal boundaries of the illuminations offered by the fog lamp assemblies 36 and 36', as will be later described in more detail.

As will understood also from FIG. 3, the pair of recesses 40 and 40' in the grill body 30 divides its remainder into a midportion 44, a left hand end portion 46, as seen from the front side of the grill 20 as in FIG. 2, and a right hand end portion 46'. The midportion 44 of the grill body 30 is shown in an enlarged cross sedton in FIG. 10, and the right hand end portion 46 in FIG. 9. The left hand end portion 46' is identical with the right hand end portion 46. It will be seen from FIGS. 9 and 10 that all these grill body portions 44, 46 and 46' are cross sectionally convexed rearwardly. A reflective layer 48 is formed at least on the inside surface of the midportion 44, and preferably on the inside surfaces of both end portions 46 and 46', too, of the grill body 30, as by vapor deposition of a reflective metal or by coating of a reflective paint. Such reflective layer may also be formed on the surfaces of the recesses 40 and 40' as required or desired.

Figure 4:
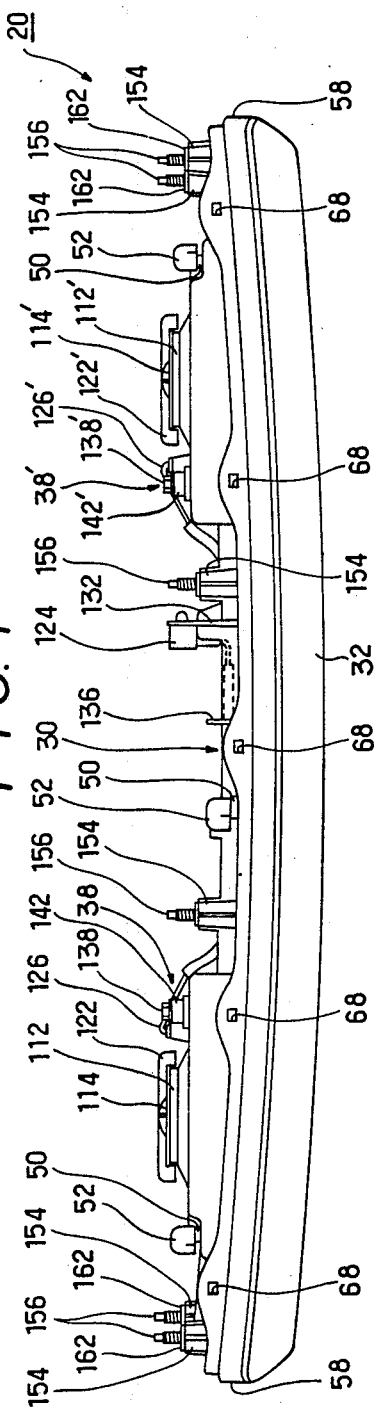
FIG. 4 is a top plan of the grill.
Figure 8:
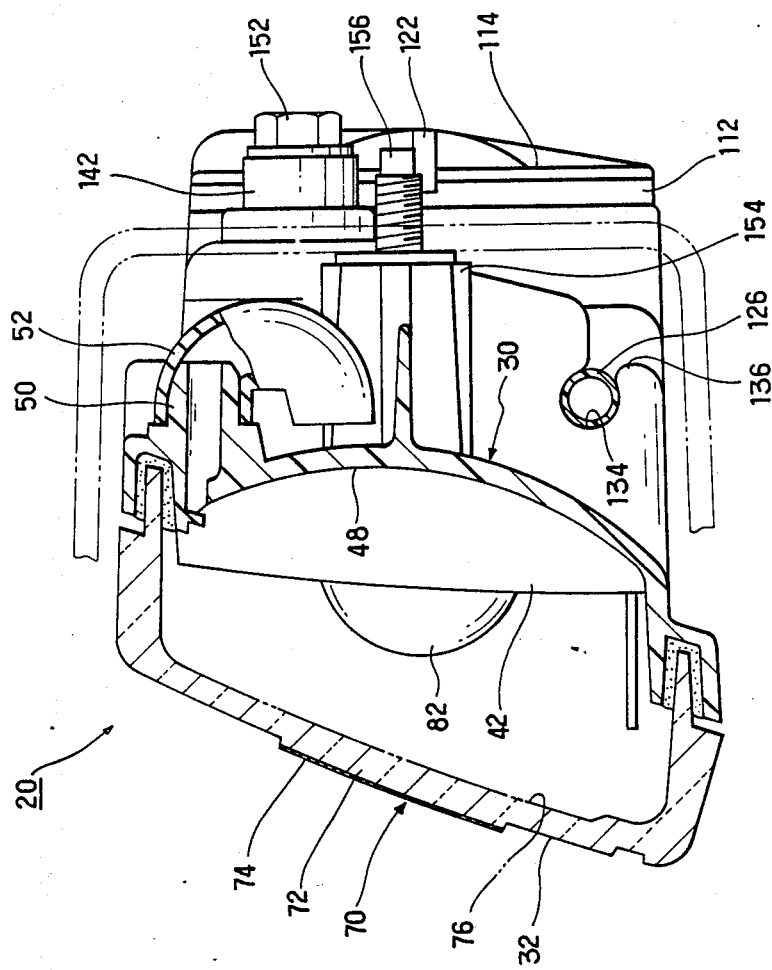
FIG. 8 is also an enlarged cross section through the grill, taken along the line VIII—VIII in FIG. 5 and showing in particular how the watertight lighting chamber of the grill is vented.

As depicted in FIGS. 4 and 5, and on an enlarged scale in FIG. 8, the grill body 30 has three vent tubes 50 extending rearwardly therefrom for ventilating the lighting chamber 34 which generally is of watertight construction as will be set forth presently.

One of the vent tubes 50 is formed at an upper part of the midportion 44, and the other two at the upper parts of the recesses 40 and 40'. U shaped extension tubes 52, typically made of rubber, are fitted one over each vent tube 50. Bent downwardly and further back toward the grill body 30, the extension tubes 52 serve to prevent water intrusion into the lighting chamber 34. Positioning pins 54 on the back of the grill body 30 determine the angular positions of the extension tubes 52.

Lens

Figure 6:
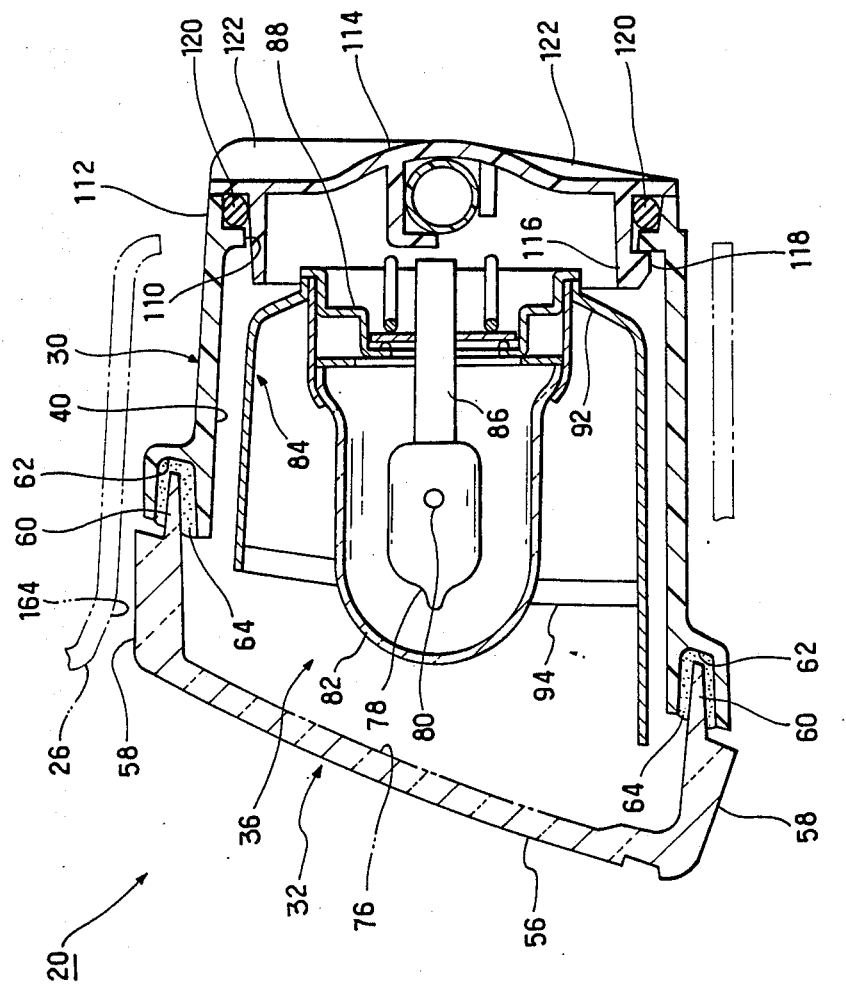
FIG. 6 is an enlarged cross section of the grill, taken along the line VI—VI in FIG. 5 and showing in particular one of the fog lamp assemblies built into the grill.

Although the lens 32 appears in all but FIG. 5 of the attached drawings, reference may be had to FIG. 6 for a detailed study of its configuration. Molded from a transparent plastic, the lens 32 integrally comprises a substantially flat major portion 56 extending rearwardly as it extends upwardly, and an annular flange portion 56 extending rearwardly from the periphery of the major portion. The flange portion 58 terminates in a tongue 60 of reduced thickness which is loosely engaged in an annular groove 62 formed in, and extending along, the periphery of the grill body 30. An adhesive is filled at 64 in the gap left by the tongue 60 in the groove 62 for firmly and watertightly bonding the tongue and groove joint between the grill body 30 and the lens 32.

Figure 7:
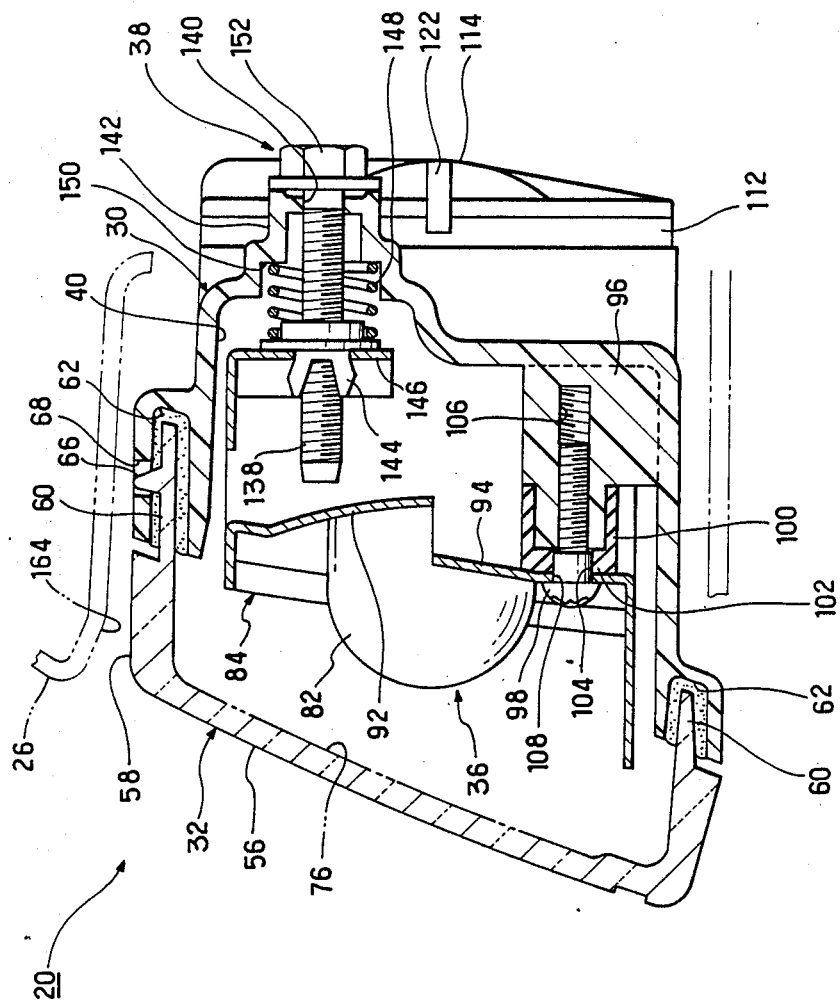
FIG. 7 is also an enlarged cross section of the grill, taken along the line VII—VII in FIG. 5 and showing in particular how each fot lamp assembly is pivotally mounted to the grill body and how it is tilted with respect to the grill body.

Preferably, as will be understood from FIGS. 4 and 7, the tongue 60 of the lens 32 may have a series of lockpins 66 formed thereon at suitable spacings. These lockpins 66 may be engaged in holes 68 in the grill body 30 by virtue of the resiliency of the flange portion 58 and tongue 60 of the molded plastic lens 32 when the tongue is inserted in the groove 62 in the grill body.

Figure 10:
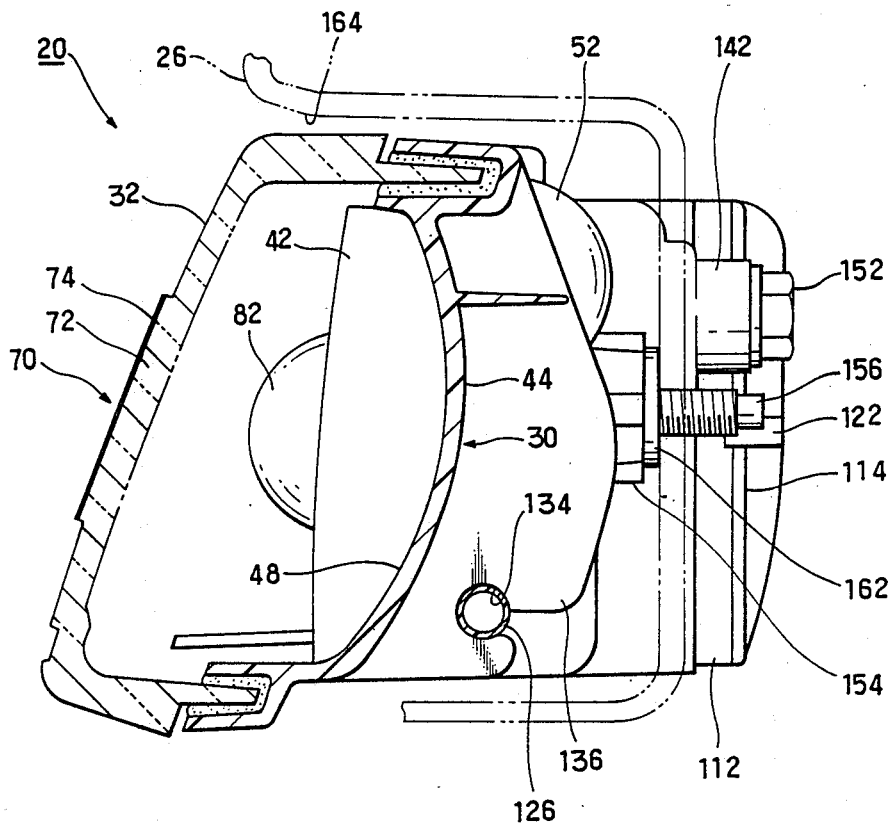
FIG. 10 is also an enlarged cross section through the grill, taken along the line X—X in FIG. 5.

FIGS. 2, 8 and 10 show markings 70 that may be formed on the lens 32 as desired. Such markings 70 may include, for example, bosses 72 formed on the outer surface of the lens 32, and paintings 74 on the bosses.

Conventional lens steps are formed on the complete inside surface of the lens 32 except its parts behind the markings 70, as indicated at 76 in FIGS. 6–8.

Fog Lamp Assemblies

As will be noted from FIG. 3, the two fog lamp assemblies 36 and 36' are of identical construction. Only the left hand fog lamp assembly 36 will therefore be described in detail, it being understood that the same description applies to the right hand fog lamp assembly 36'. The various parts of the right hand fog lamp assembly 36' will be identified by priming the reference numerals used to denote the corresponding parts of the left hand fog lamp assembly 36.

As best seen in FIG. 6, the representative fog lamp assembly 36 comprises a light bulb 78 having a filament 80, a coloring globe 82 enveloping the light bulb, and a paraboloidal reflector 84.

The light bulb 78 has a stem 86 which is coupled to the paraboloidal reflector 84 via a mounting ring 88. So mounted to the reflector 84, the light bulb 78 has its filament 80 positioned approximately at the focus of the reflector. Also, as indicated by the dashed lines designated 90 in FIG. 3, the lines connecting the bulb filament 80 and the front edges of the pair of vertical ribs 42 on both sides of the lamp assembly 36 should cross the lens 32 at its left hand end and longitudinal midpoint. In this manner the two fog lamp assemblies 36 and 36' will illuminate all of the major portion 56 of the lens 32.

The coloring globe 82 is bell shaped and its its open end coupled fast to the paraboloidal reflector 84. The globe 82 is itself colored yellow as the lamp assembly 36 is intended for use as fog lamp in this embodiment. The globe might be of a different color, or might be dispensed with, if the lamp assembly were intended for a different purpose. Incidentally, in the use of the lamp assembly as a fog lamp, its optical axis may be slightly angled downwardly (e.g. 0.7 degree to the horizontal plane) by the associated lamp tilting mechanism 38 for optimum road illumination.

With reference to FIGS. 3, 6 and 7 the paraboloidal reflector 84 is a sheet metal pressing integrally comprising a major portion 92 and a pair of mounting flanges 94 on both sides of the major portion. As a whole the paraboloidal reflector 84 is rectangular in shape as seen in a front view, elongated horizontally, and is positioned in the recess 40 in the grill body 30.

As illustrated in FIGS. 3 and 7, the pair of mounting flanges 94 of the reflector 84 are fastened at points adjacent their lower ends to bosses 96 of the grill body 30 by screws 98. Interposed between the reflector flanges 94 and the grill body bosses 96 are reflector seats 100 of elastomer or like elastic material. Each reflector seat 100 is in the shape of a relatively short tube having one end closed at 102, with a hole 104 extending through this closed end. As the tubular reflector seats 100 are fitted over the grill body bosses 96, the holes 104 in their closed ends 102 come into axial alignment with tapped holes 106 in the bosses.

With the paraboloidal reflector 84 held in position in the grill body recess 40, the screws 98 are inserted in the tapped holes 106 in the grill body bosses 96 through holes 108 in the reflector flanges 94 and through the holes 104 in the reflector seats 100. So mounted to the grill body 30, the reflector 84 with the light bulb 78 coupled thereto is pivotable about a horizontal axis extending longitudinally of the grill 20, the ends 102 of the reflector seats 100 being sufficiently thick and elastic to permit such pivotal displacement of the reflector within limits.

The two fog lamp assemblies 36 and 36' are to be adjustably pivoted about the noted horizontal axis by the tilting mechanisms 38 and 38' to be detailed subsequently.

As will be seen from both FIGS. 3 and 6, the grill body 30 has an access hole 110 of relatively large diameter formed centrally in the recess 40 to make possible the replacement of the light bulb 78. An annular rim 112 extends rearwardly from the grill body 30 in concentric relation to the access hole 110.

Openably closing the access hole 110 is a plastic lid 114 having an annular rim 116 extending forwardly therefrom. This rim 116 has a plurality of projections, one seen at 118, formed radially thereon at circumferential spacings. The grill body edge bounding the access hole 110 has indentations, not shown, formed therein in positions of annular alignment with the projections 118 on the rim 116 of the lid 114. A sealing ring 120 is fitted over the rim 116.

For closing the access hole 110 the rim 116 of the lid 114 may be inserted therein, with the projections 118 on the rim passed through the unshown indentations in the grill body 30. Then the lid 114 may be manually turned in a predetermined direction by grasping a set of fingerhold blades 122 on its back, until the lid comes into abutment against the rim 112 on the grill body 30. The sealing ring 120 will then become compressed between grill body 30 and lid 114 thereby watertightly sealing the joint therebetween. The lid 114 will be locked against accidental detachment as the projections 118 on its rim 116 positively engages the grill body edge bounding the access hole 110. The foregoing procedure may be reversed for opening the access hole 110 for the replacement of the light bulb 78.

Figure 11:
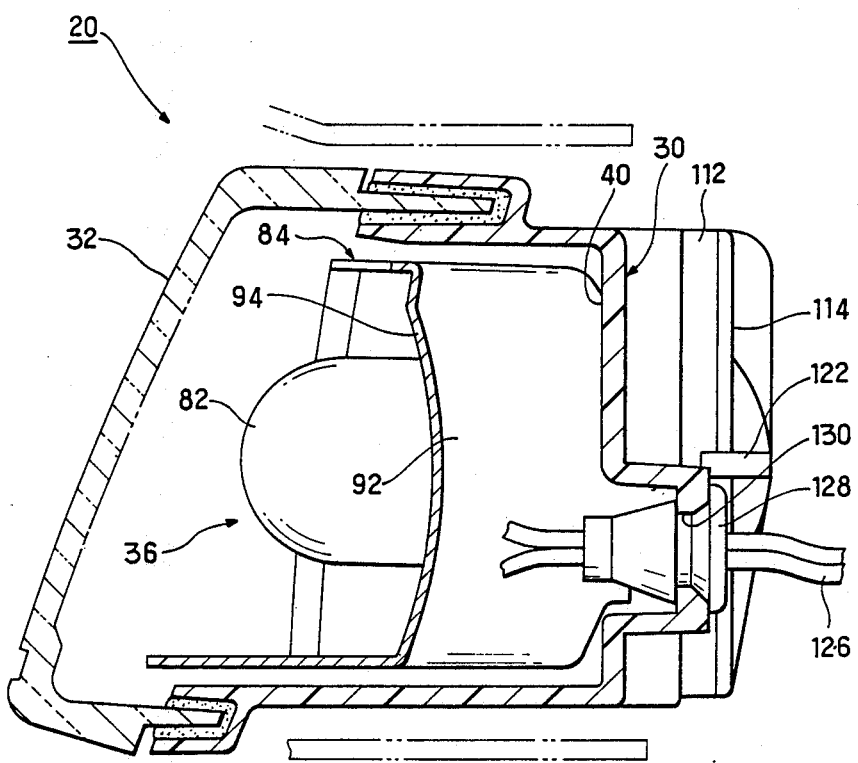
FIG. 11 is also an enlarged cross section through the grill, taken along the line XI—XI in FIG. 5 and showing in particular how the power line of each lamp assembly is led out from the lighting chamber.

Reference may be had to FIGS. 4, 5 and 11 for a consideration of how the light bulb 78 is electrically coupled to a connector 124 on the back of the grill body 30. A power line 126 for the light bulb 78 extends through a grommet 128 fitted in a hole 130 which is formed in the back of the grill body 30 in the adjacency of its bottom. So led out from the lighting chamber 34, the power line 126 is connected to the connector 124 on a support wall 132 formed in one piece with the grill body 30. The connector 124 is disposed approximately centrally of the longitudinal dimension of the grill body 30 to serve both fog lamp assemblies 36 and 36'.

On its way from grommet 128 to connector 124 the power line 126 is pressfitted in one or more notches 134 in a reinforcing rib or ribs 136 integral with the grill body 30, as illustrated in detail in FIGS. 8 and 10. It will be observed from FIG. 5 in particular that the the notches 134 are disposed on a lower level than the connector 124 and the grommet 128. Thus, with most of the power line 126 held below the levels of the connector 124 and the grommet 128, the moisture that will collect on this part of the power line is prevented from entering the grill body 30 or the connector 124.

Lamp Tilting Mechanisms

The tilting mechanism 38 for the left hand fog lamp assembly 36 is shown in detail in FIG. 7, it being understood that the right hand lamp tilting mechanism 38' is of like construction. The left hand lamp tilting mechanism 38 includes an adjusting bolt 138 which is rotatably inserted in a hole 140 in the end of a supporting sleeve 142 integral with the grill body 30. The supporting sleeve 142 is positioned above one of the reflector seats 100.

In threaded engagement with the adjusting bolt 138 is a nut 144 of plastic material affixed to a flange 146 formed behind the reflector 84 in one piece therewith. A helical compression spring 148 extends between the nut 144 and a shoulder 150 of the supporting sleeve 142, acting to bias the head 152 of the adjusting bolt 138 into abutment against the end of the supporting sleeve.

Thus, as the adjusting bolt 138 is turned, the nut 144 will travel forwardly or rearwardly of the bolt depending upon the direction of its rotation. The longitudinal position of the adjusting bolt 138 with respect to the grill body 30 will remain unchanged by virtue of the compression spring 148. Accordingly, with the bidirectional rotation of the adjusting bolt 138, the fog lamp assembly 36 comprised of the light bulb 78 and the paraboloidal reflector 84 will pivot back and forth about the horizontal axis extending through the pair of elastic reflector seats 100.

Mounting of the Grill to the Vehicle Body

Figure 9:
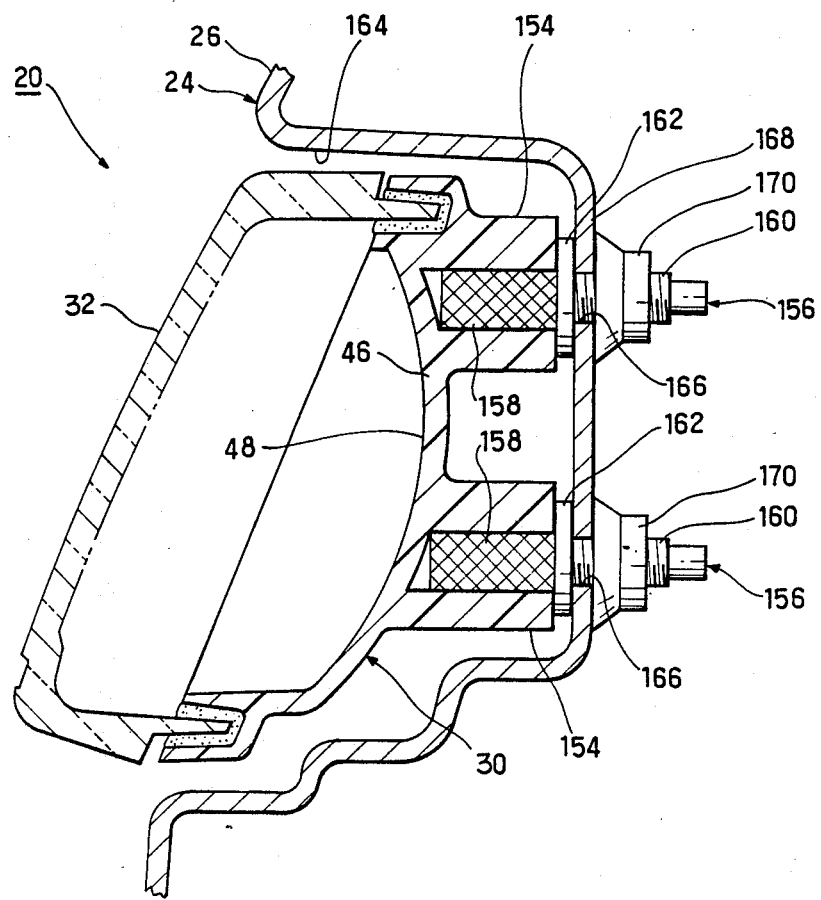
FIG. 9 is also an enlarged cross section through the grill, taken along the line IX—IX in FIG. 5 and showing in particular how the grill is mounted to the car body.

The means for mounting the self-illuminated grill 20 to the car body 24 are seen in FIGS. 3-5 and on an enlarged scale in FIG. 9. Such mounting means include a plurality of, six in this embodiment, mounting sleeves 154 formed on the back of the grill body 30 in suitable placement. The mounting sleeves 154 are open rearwardly for snugly receiving studs 156.

Each stud 156 has half its length knurled at 158, and the other half threaded at 160, with a collar 162 formed at the boundary between the two halves. It is the knurled halves 158 of the studs 156 that are snugly engaged in the mounting sleeves 154, until the collars 162 come to butt on the ends of the sleeves.

As will be seen from FIG. 9, taken together with FIG. 1, the grill 20 is received in a recess 164 formed in the front end panel 26 of the car body 24 and extending between the pair of headlamps 28. The threaded halves 160 of the studs 156 are inserted in and through mounting holes 166 in a wall 168 defining the recess 164. On the back of this wall 168, nuts 170 are tightened on the projecting parts of the threaded halves 160 of the studs 156, firmly engaging the wall 168 between themselves and the collars 162 on the studs.

Functions and Advantages

The grill 20 with the built-in fog lamp assemblies 36 and 36' realizes a remarkable reduction of the number of the constituent parts, as well as the steps of assemblage and mounting, compared with the prior art wherein the grill and the fog lamp assemblies form separate entities and are mounted in separate positions on the vehicle body.

During nighttime, as the light bulbs 78 are lit up, the lens 32 will be thoroughly illuminated, as has been explained with reference to FIG. 3. During daytime, too, the complete length of the lens 32 will appear illuminated as not only the paraboloidal reflectors 84 of the fog lamp assemblies but also the reflective layers 48 on the midportion 44 and end portions 46 and 46' of the grill body reflect the daylight. The concave shape of these grill body portions 44, 46 and 46' serves to efficiently reflect the light toward the lens 32. It will also be appreciated that the concave shape of the grill body portions 44, 46 and 46' performs the additional function of enhancing the mechanical strength of the grill 20. Thus, during both night and day, the self-illuminated grill 20 will lend a novel aesthetic appeal to the car.

The building of the fog lamp assemblies 36 and 36', or equivalent auxiliary front lamps, within the grill 20 offers a further advantage. In event the headlamps 28 fail for filament breakage or some other readon during night driving, such auxiliary lamps maybe lit up as a makeshift safety measure.

An additional advantage is that, although generally sealed watertightly, the lighting chamber 34 is in constant communication with the atmosphere via the vent tubes 50 with the U shaped extension tubes 52. The ventilation of the lighting chamber 34 is effective to prevent the inside surface of the lens 32, the paraboloidal reflectors 84, and the reflective surfaces 44, 46 and 46' of the grill body 30 from becoming dim with moisture. The U shaped extension tubes 52 make it possible to ventilate the lighting chamber 34 without the possibility of water intrusion.

A variety of modifications or alterations of the above disclosed grill 20 will manifest themselves to those skilled in the art to conform to design preferences or to the requirements of each specific application of the invention, without departing from the scope of the invention.

What is claimed is:

1. A self-illuminated grill for a motor vehicle of the type having a pair of headlamps disposed in horizontally spaced apart positions on the front end of a vehicle body, comprising:
   (a) an elongate grill body to be mounted to the vehicle body so as to be disposed horizontally between the pair of headlamps, the grill body being generally open forwardly of the motor vehicle;
   (b) an elongate lens mounted to the open front side of the grill body and coacting therewith to define an enclosed lighting chamber; and
   (c) said headlamps disposed in the lighting chamber for illuminating substantially the complete length of the lens.

2. The self-illuminated grill of claim 1 wherein the light source means comprises a pair of lamp assemblies mounted in horizontally spaced apart positions in the lighting chamber and coacting to illuminate substantially the complete length of the lens.

3. The self-illuminated grill of claim 2 wherein each lamp assembly comprises:
   (a) a reflector mounted to the grill body; and
   (b) a light bulb replaceably mounted to the reflector.

4. The self-illuminated grill of claim 3 further comprising:
   (a) mounting means for mounting the reflector of each lamp assembly to the grill body for pivotal motion about a horizontal axis extending longitudinally of the grill; and
   (b) lamp tilting means for adjustably tilting each lamp assembly about the horizontal axis with respect to the grill body.

5. The self-illuminated grill of claim 4 wherein the lamp tilting means comprises:
   (a) a male threaded member rotatably extending through the grill body;
   (b) a female threaded member mounted to the reflector of each lamp assembly and engaged with the male threaded member; and
   (c) resilient means acting between the grill body and the reflector for biasing them away from each other.

6. The self-illuminated grill of claim 4 wherein the mounting means comprises:
   (a) a pair of reflector seats of elastic material on the grill body; and
   (b) a pair of fastener elements fastening the reflector of each lamp assembly to the grill body via the respective reflector seats, the reflector seats being capable of elastic deformation to permit the reflector to pivot about the horizontal axis.

7. The self-illuminated grill of claim 2 wherein the grill body has a reflective surface formed at least between the pair of lamp assemblies.

8. The self-illuminated grill of claim 1 further comprising:
   (a) a vent tube formed on the grill body for ventilating the lighting chamber; and
   (b) a U shaped extension tube coupled to the vent tube for preventing the intrusion of water into the lighting chamber.

9. A self-illuminated grill for a motor vehicle, comprising:
   (a) an elongate grill body;
   (b) an elongate lens joined to the grill body and coacting therewith to define a lighting chamber;
   (c) a pair of lamp assemblies disposed in the lighting chamber and spaced from each other in the longitudinal direction of the grill for illuminating the complete length of the lens, each lamp assembly being mounted to the grill body for pivotal motion about an axis extending longitudinally of the grill; and
   (d) lamp tilting means for adjustably tilting each lamp assembly about the horizontal axis with respect to the grill body.

10. The self-illuminated grill of claim 9 wherein the grill body is formed to include a first reflective surface between one end thereof and one of the lamp assemblies, a second reflective surface between air of lamp assemblies, and a third reflective surface between the other end of the grill body and the other of the lamp assemblies.

11. The self-illuminated grill of claim 10 wherein the lamp assemblies include reflectors accommodated in recesses in the grill body, one of the recesses being disposed between the first and second reflective surfaces and the other recess between the second and third reflective surfaces, whereby the complete length of the lens appears illuminated as the first, second and third reflective surfaces of the grill body and the reflectors of the lamp assemblies reflect the daylight.

* * * * *